United States Patent [19]
Ord

[11] 3,905,304
[45] Sept. 16, 1975

[54] CHAIN FOR CONVEYOR SYSTEM

[75] Inventor: Walter Desmond Ord, Birmingham, England

[73] Assignee: Redman Fisher Engineering Limited, Tipton, England

[22] Filed: July 10, 1974

[21] Appl. No.: 487,002

[30] Foreign Application Priority Data
July 20, 1973 United Kingdom............... 34833/73

[52] U.S. Cl................ 104/172 C; 59/78; 74/250 C
[51] Int. Cl.² ......................................... B61B 13/00
[58] Field of Search......... 104/172 R, 172 C, 172 S, 104/89, 91; 198/203, 189; 59/78, 78.1; 74/245 R, 245 C, 250 R, 250 C

[56] References Cited
UNITED STATES PATENTS
2,695,095  11/1954  Anderson........................... 198/189

FOREIGN PATENTS OR APPLICATIONS
909,951  11/1962  United Kingdom................ 198/189
1,207,210  2/1960  France.............................. 198/189

Primary Examiner—M. Henson Wood, Jr.
Assistant Examiner—Randolph A. Reese
Attorney, Agent, or Firm—Friedman & Goodman

[57] ABSTRACT

In a chain such as is used in power-and-free conveyors and has a plurality of links and a plurality of connecting bodies arranged alternately along the length of the chain with each body being connected to a pair of links for pivoting movement relative thereto about respective mutually-perpendicular axes, each link comprises a pair of link elements arranged side-by-side. The body has a projecting lug which limits pivotal movement of one link relative to the body so that such link cannot pivot through an angle of 180° from the position occupied when the chain is straight. The lug prevents assembly of the chain with an incorrect pitch.

4 Claims, 3 Drawing Figures

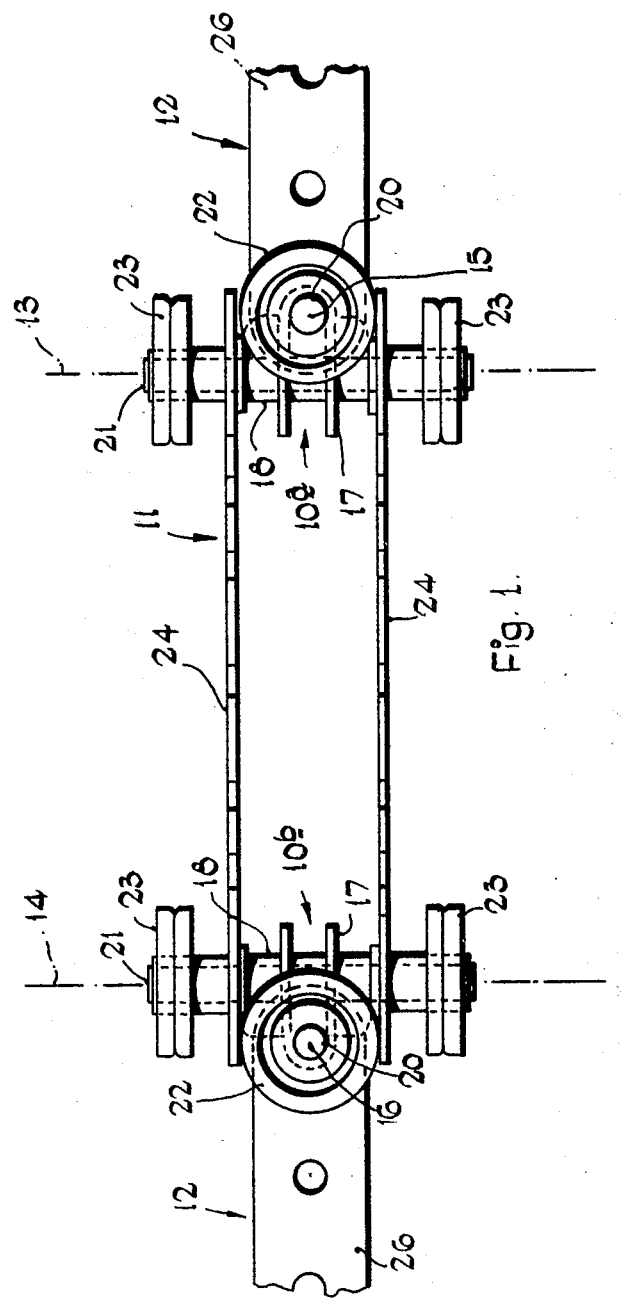

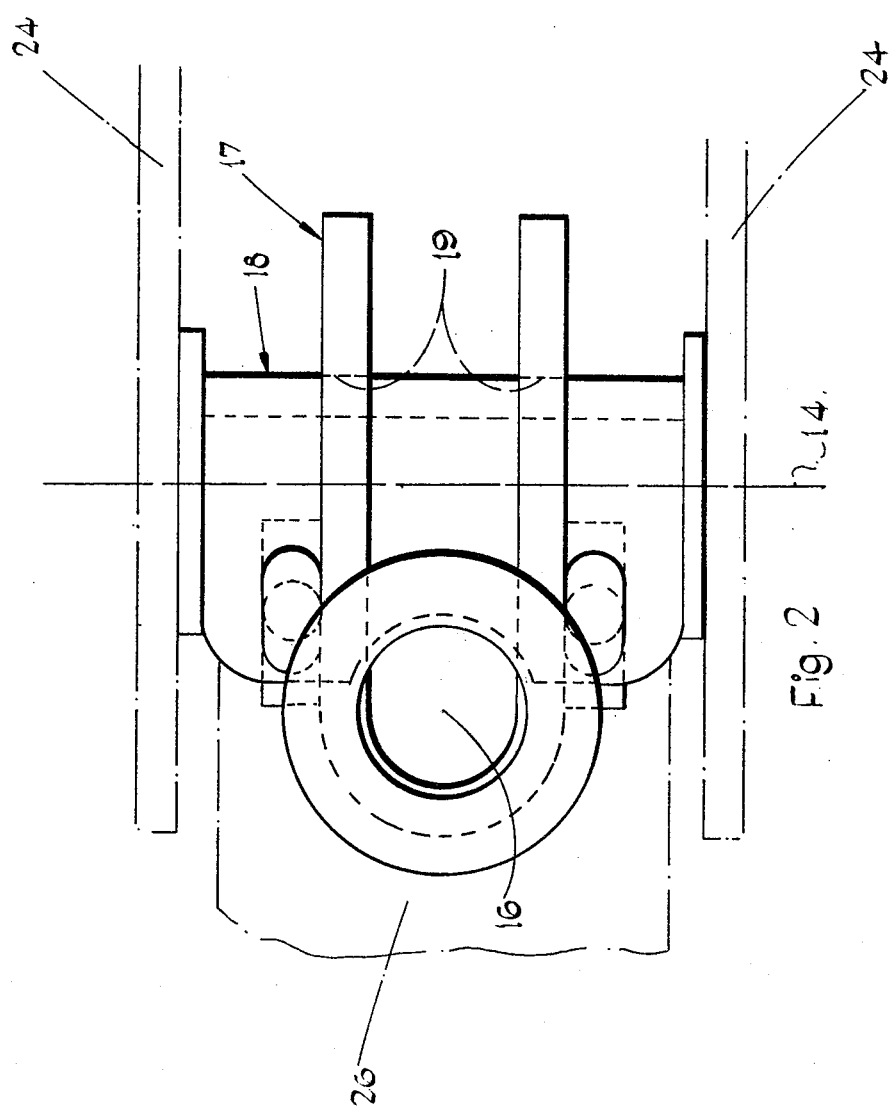

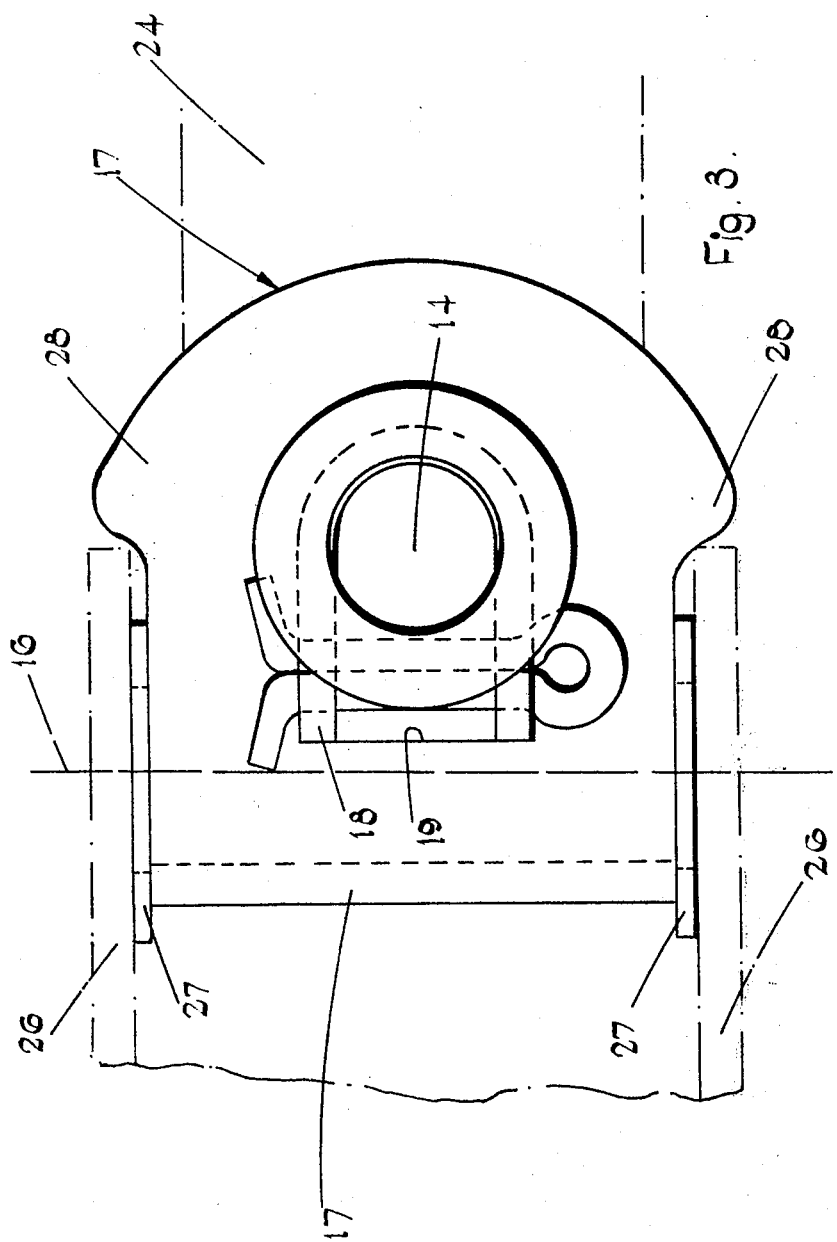

CHAIN FOR CONVEYOR SYSTEM

BACKGROUND TO THE INVENTION.

This invention relates to a chain of the kind (hereinafter called the kind specified) comprising a plurality of links and a plurality of connecting bodies arranged alternately along the length of the chain, each body being connected to a pair of links for pivoting movement relative thereto about respective mutually-perpendicular axes and each link comprising a pair of link elements arranged side by side.

Chains of the kind specified are commonly used in power and free conveyors, that is conveyors comprising two parallel tracks mounted adjacent to each other, load-supporting trolleys which run on one of the tracks, a power-driven chain which runs on the other track and releasably mutually-engageable drive-transmitting means on the chain and trolleys respectively whereby the trolleys can be driven selectively along their track by the chain.

In a chain of the kind specified, the axes about which a particular body can move relative to the associated pair of links are spaced from one another longitudinally of the chain. With known chains of the kind specified, it is possible to assemble a particular body with the associated links either so that the pivot axis of the front associated link is forward of the pivot axis of the rear associated link, or alternatively so that the pivot axis of the front associated link is to the rear of the pivot axis of the rear associated link. Whichever of these alternative arrangements is intended when a particular conveyor is designed, it is possible for the components of the conveyor to be assembled so that the pitch of the chain differs from the designed pitch, in one case being greater than the designed pitch and in the other case being less than the designed pitch. Incorrect assembly of a body with the associated pair of links is more likely to occur when a part of a conveyor chain is disassembled for maintenance purposes, than when the components of the conveyor chain are first assembled together.

Incorrect assembly of the components of a chain of the kind specified to give in at least part of the chain a pitch which differs from the designed pitch can result in serious damage to associated equipment, for example other parts of a conveyor assembly of which the chain forms a part.

SUMMARY OF THE INVENTION.

It is an object of the present invention to reduce or overcome the foregoing problem.

According to the invention we provide a chain of the kind specified wherein pivotal movement of each body relative to at least one of the links connected thereto is limited by engagement of said one link with the body in such a manner as to prevent relative pivoting through 180° from the relative positions occupied when the chain is straight.

The body may comprise a first part which is received between the elements of said one link and a second part adjacent to the first part, which second part has a dimension measured in the direction of separation of said elements which is greater than said separation.

BRIEF DESCRIPTION OF THE DRAWINGS.

The invention will now be described by way of example with reference to the accompanying drawings wherein:

FIG. 1 shows in side elevation a part of a chain of the kind specified,

FIG. 2 shows on an enlarged scale and in side elevation a connecting body and adjacent parts of associated links of the chain of FIG. 1, further parts being omitted from FIG. 2, and FIG. 3 illustrates the parts shown in FIG. 2 in plan view.

DESCRIPTION OF THE PREFERRED EMBODIMENT.

The chain illustrated in FIG. 1 comprises a plurality of connecting bodies 10 and a plurality of links 11 and 12, the links and connecting bodies being arranged alternately along the chain. The connecting bodies 10 are all identical one with another, but alternate bodies face in opposite directions along the chain. The links 11 differ somewhat from the links 12, the links 11 being somewhat longer. The links 11 and 12 alternate with each other along the length of the chain. FIG. 1 shows a longer link 11 in its entirety and one half of each of two shorter links 12.

Each of the longer links 11 is connected adjacent to its ends with two associated bodies 10 for pivoting movement relative thereto about vertical axes 13 and 14 respectively. Each of the shorter links 12 is connected adjacent to its ends with a pair of associated bodies 10 for pivoting movement relative thereto about horizontal axes 15 and 16 respectively. The axes 13 to 16 each extend transversely of the length of the chain and the two pivot axes of each connecting body 10 are mutually perpendicular.

Each connecting body 10 comprises two members, 17 and 18 respectively, both having a U-shaped cross-sectional shape and the member 17 being larger than the member 18. The member 18 is received in a pair of apertures 19, formed one in each limb of the larger member 17. The respective open mouths of the members 17 and 18 face in opposite directions.

Each connecting body 10 further comprises a pair of spindles 20 and 21 respectively (not shown in FIGS. 2 and 3). The spindle 20 is received within the base portion of the U-shaped member 17 and opposite end portions of the spindle 20 project laterally beyond the limbs of the U-shaped member 18 to receive running wheels 22 rotatably mounted on opposite end portions of the spindle. The spindle 21 is received within the base portion of the smaller U-shaped member 18 and projects above and below the limbs of the larger U-shaped member 17 to receive guiding wheels 23 rotatably mounted on opposite end portions of the spindle 21. The spindle 20 can turn about its longitudinal axis relative to the larger U-shaped member 17 with which it is engaged and the spindle 21 can turn about its own longitudinal axis relative to the member 18.

Each longer link 11 comprises two elongate plate-like elements 24 which are arranged in face-to-face, spaced-apart relation. Each of the elements 24 is formed adjacent to each of its ends with an opening to receive a respective one of the spindles 21, the spindle thereby providing the pivotal connection between the longer link and the associated body 10. The end portions of the elements 24 are disposed outside the limbs of the smaller U-shaped member 18 and are so secured to the spindle 21 that the link elements 24 and spindle 21 pivot together relative to the U-shaped members 17 and 18.

Each of the shorter links 12 also comprises two link elements 26 each formed adjacent to both of its ends with openings to receive respective ones of the spindles 20. The end portions of the elements 26 are situated outside the limbs of the larger U-shaped member 17 and are so secured to the spindle 20 that the elements 26 and spindle 20 pivot together relative to the U-shaped members 17 and 18.

It will be noted that the vertical pivot axis 13 and the horizontal pivot axis 15 of the connecting body 10a shown in FIG. 1 are spaced apart lengthwise of the chain, the vertical axis being to the left of the horizontal axis, as viewed in FIG. 1. If the chain was to be assembled with the vertical pivot axis 13 of the body 10a to the right of the horizontal pivot axis 15, the pitch of that part of the chain which is illustrated in FIG. 1 would differ from the designed pitch. In order to prevent such incorrect assembly of each connecting body 10 with the associated links 11 and 12, each connecting body is adapted to limit pivoting of the associated shorter link 12 so that this link cannot be pivoted through 180° from the relative position which the link and body assume when the chain is straight.

Those parts of the limbs of the larger U-shaped member 17 which normally lie between the link elements 26 have a width somewhat less than the spacing between the elements 26 of the link 12 so that washers 27 can be interposed between the elements 26 and the member 17. An adjacent part of the member 17, which part is not received between the link elements 26, is formed with lugs 28 which increase the width of this part of the member 17 to a value greater than the separation of the link elements 26. Accordingly, the link 12 cannot be pivoted relative to the associated body 10 to a position such that the lugs 28 are disposed between the link elements 26. It will be seen from FIG. 2 that the dimensions of each link element 26 in a direction parallel to the axis 14 is greater than the spacing between the limbs of the member 17. If, during assembly, the elements 26 are positioned beside the wider part of the U-shaped member 17, the elements 26 are too far apart to be properly mounted on their spindle 20.

Whilst the provision of the lugs 28 for limiting pivoting of the link elements 26 relative to the associated connecting bodies 10 is sufficient to prevent assembly of the chain with an incorrect pitch, means may additionally or alternatively be provided for limiting pivoting of the longer links 11 relative to each connecting body 10.

I claim:

1. In a chain of the kind comprising a plurality of links and a plurality of connecting bodies arranged alternately along the length of the chain, each body being connected to a pair of links for pivoting movement relative thereto about respective mutually-perpendicular axes and each link comprising a pair of link elements arranged side-by-side, the improvement wherein there is provided on the body means for engaging with at least one of the links connected thereto for preventing relative pivoting of the body and said one link through 180° from the relative positions occupied when the chain is straight and for preventing reversal of said body relative to said one link to change the pitch of the chain.

2. The improvement according to claim 1 wherein said body comprises a first part which is received between the elements of said one link and a second part adjacent to the first part and wherein said second part has a dimension measured in the direction of separation of said elements which is greater than said separation.

3. The improvement according to claim 2 wherein said second part of the body includes two lugs which project laterally from the body beyond the first part thereof and wherein both of said lugs are integral with a common member of the body.

4. A chain comprising a plurality of links and a plurality of connecting bodies wherein:
each body is connected by respective spindles to a pair of adjacent links,
each body comprises a member of U-shape, as viewed in a direction transverse to the length of the chain, this member having a base portion and two spaced limbs, one of said spindles is received within the base portion of the U-shaped member, one of said links comprises two parallel link elements spaced apart lengthwise of said one spindle,
respective portions of said one spindle are received in aligned openings formed respectively in said two link elements, each of said link elements has a dimension in the direction in which said limbs are spaced which exceeds the spacing between the limbs, and each of said limbs includes two lugs spaced apart in said direction lengthwise of said one spindle by a distance greater than the spacing between said two link elements.

* * * * *